United States Patent
Black

(10) Patent No.: US 10,689,891 B2
(45) Date of Patent: Jun. 23, 2020

(54) ADJUSTABLE HINGE

(71) Applicant: Bell Helicoper Textron, Inc., Fort Worth, TX (US)

(72) Inventor: Ian Scott Black, Morin Heights, CA (US)

(73) Assignee: Textron Innovations Inc., Providence, RI (US)

( * ) Notice: Subject to any disclaimer, the term of this patent is extended or adjusted under 35 U.S.C. 154(b) by 457 days.

(21) Appl. No.: 15/368,650

(22) Filed: Dec. 4, 2016

(65) Prior Publication Data
US 2018/0155003 A1 Jun. 7, 2018

(51) Int. Cl.
*B64C 1/14* (2006.01)
*E05D 3/02* (2006.01)
*E05D 5/06* (2006.01)

(52) U.S. Cl.
CPC .............. *E05D 3/02* (2013.01); *B64C 1/1407* (2013.01); *E05D 5/062* (2013.01); *E05Y 2600/56* (2013.01); *E05Y 2600/636* (2013.01); *E05Y 2900/502* (2013.01)

(58) Field of Classification Search
CPC .............. E05D 7/04; E05D 2007/0484; E05D 2007/0492; E05D 7/0009; E05D 7/0407; E05D 3/02; E05D 5/062; Y10T 16/532; Y10T 16/5321; Y10T 16/5322; B64C 1/1407; B64C 1/1461
See application file for complete search history.

(56) References Cited

U.S. PATENT DOCUMENTS

| | | | | |
|---|---|---|---|---|
| 2,615,194 A * | 10/1952 | Kreiner | ..................... | E05D 7/04 16/237 |
| 3,019,472 A * | 2/1962 | Wasmuth | ................... | E05D 7/04 16/249 |
| 7,617,567 B2 * | 11/2009 | Franchini | ................... | E05D 7/04 16/236 |
| 7,748,081 B2 * | 7/2010 | Ganter | ...................... | E05D 7/04 16/235 |
| 8,672,271 B2 * | 3/2014 | Gorgoglione | ......... | B64C 1/1407 244/129.5 |
| 8,752,793 B2 * | 6/2014 | Gorgoglione | ......... | B64C 1/1407 244/129.5 |
| 8,752,794 B2 * | 6/2014 | Gorgoglione | ......... | B64C 1/1407 244/129.5 |
| 2007/0056143 A1 * | 3/2007 | Ganter | ...................... | E05D 7/04 16/242 |
| 2007/0169311 A1 * | 7/2007 | Franchini | ................... | E05D 7/04 16/236 |
| 2012/0085865 A1 * | 4/2012 | Gorgoglione | ......... | B64C 1/1407 244/129.5 |
| 2014/0021299 A1 * | 1/2014 | Gorgoglione | ......... | B64C 1/1407 244/129.5 |
| 2014/0059934 A1 * | 3/2014 | Gorgoglione | ......... | B64C 1/1407 49/359 |

* cited by examiner

*Primary Examiner* — Philip J Bonzell
(74) *Attorney, Agent, or Firm* — Lightfoot & Alford PLLC

(57) ABSTRACT

A hinge has a door interface comprising a serrated surface and an oversized hole, a bolt at least partially extending into the oversized hole, and a washer disposed on the bolt and captured between the door interface and a head of the bolt, the washer comprising a serrated surface facing toward the serrated surface of the door interface. The oversized hole has a diameter selected to allow significant radial movement of the bolt within the oversized hole.

20 Claims, 10 Drawing Sheets

ADJUSTABLE HINGE

BACKGROUND

Vehicles and structures comprising doors sometimes comprise doors that are installed using a lengthy and customized process. In some cases, a close fit is required between a structure and a door associated with the structure. Custom shims and/or hardening filler material can be used to orient a door to a structure and seal the door relative to the structure when the door is closed.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
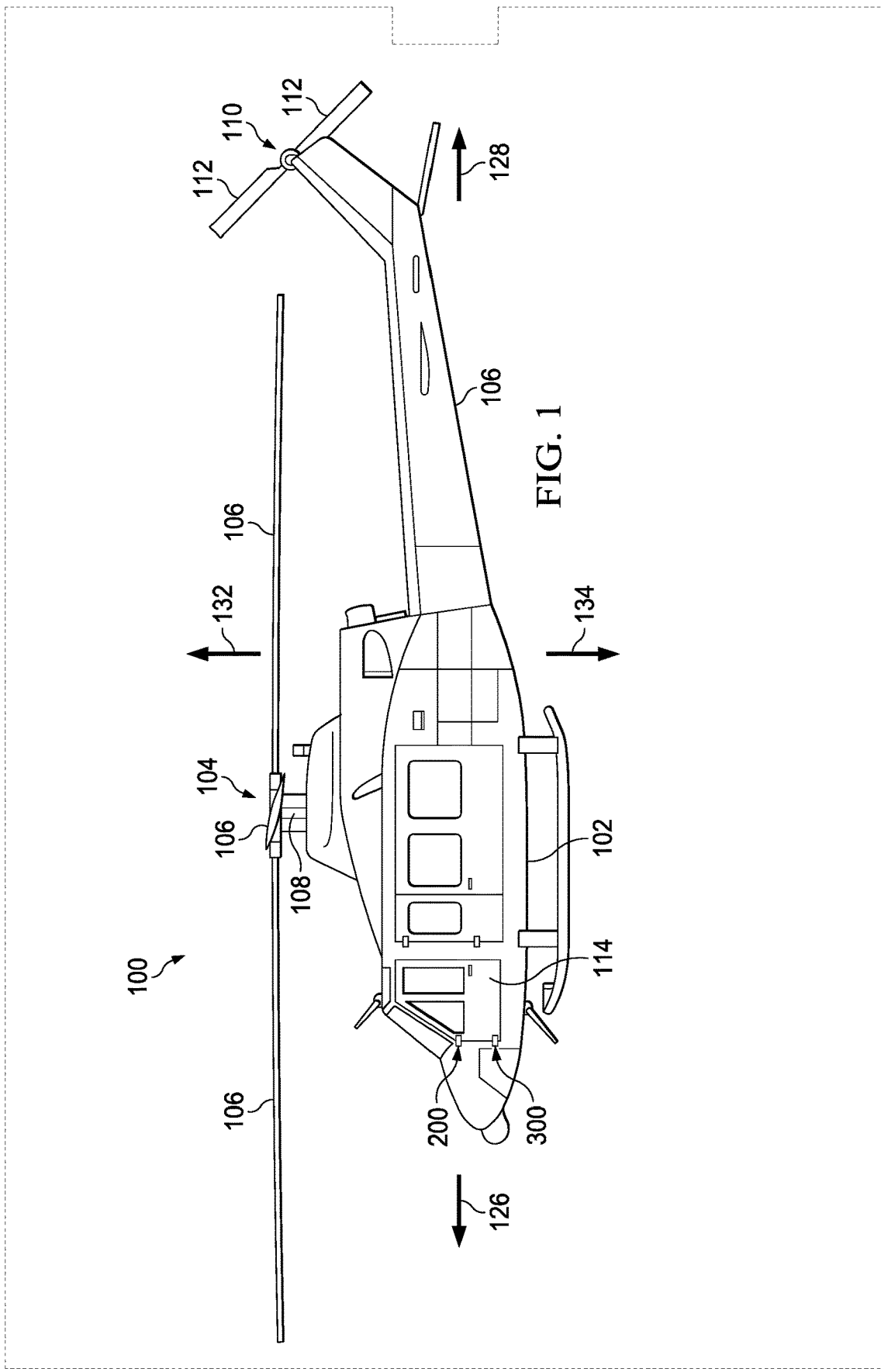
FIG. 1 is an orthogonal side view of an aircraft according to an embodiment of this disclosure.
Figure 2:
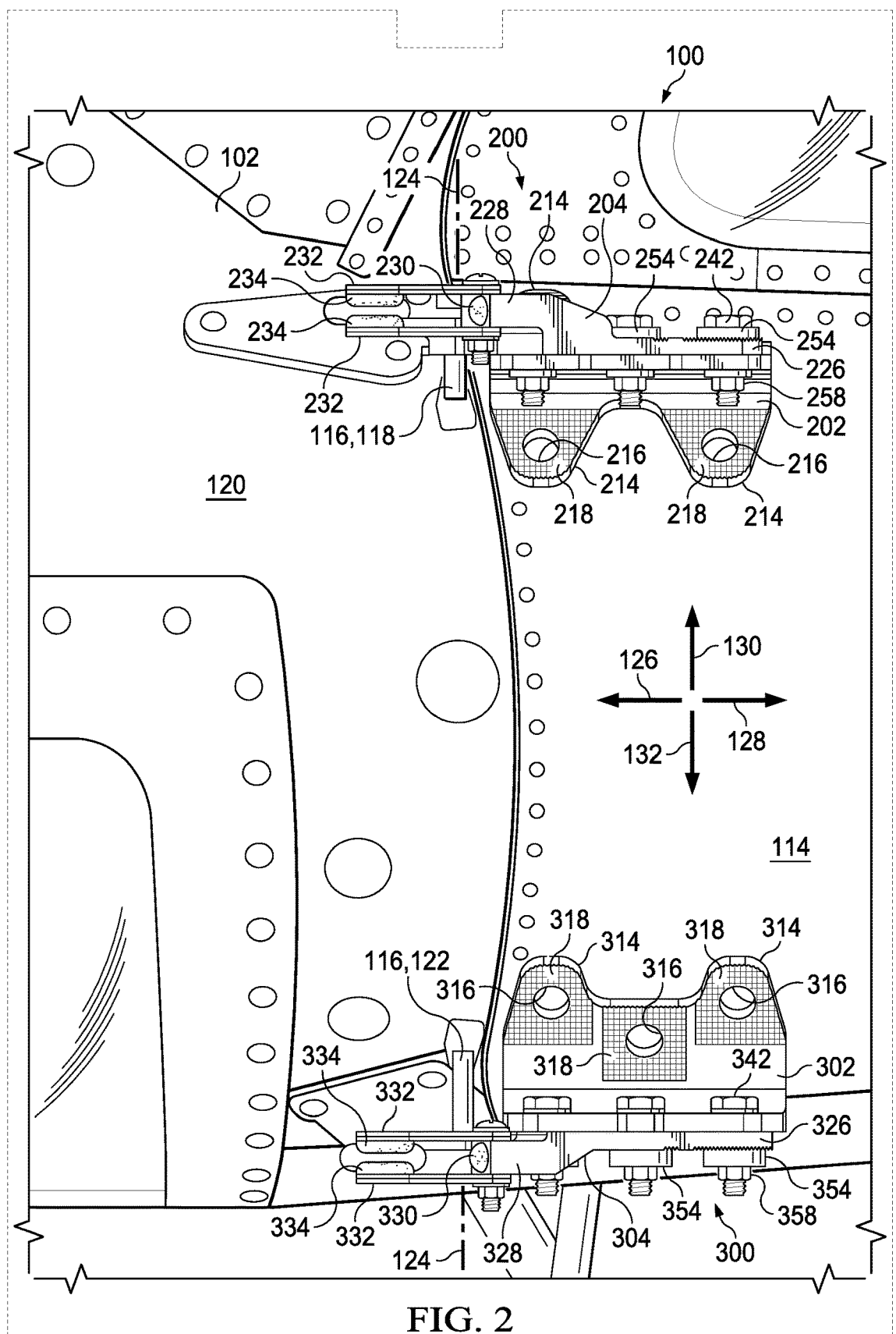
FIG. 2 is a partial orthogonal side view of the aircraft of FIG. 1.
Figure 3:
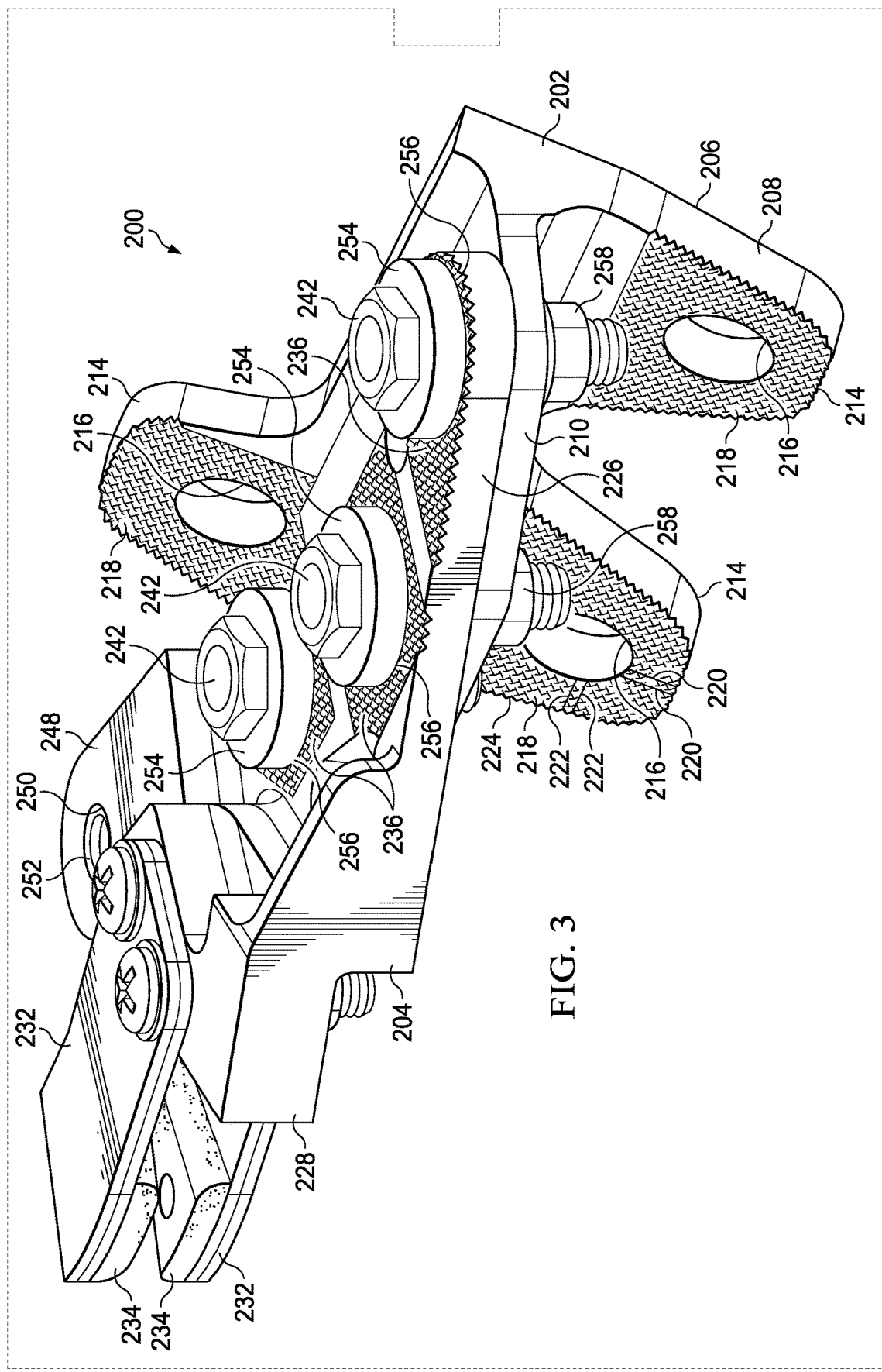
FIG. 3 is an oblique view of an upper hinge of the aircraft of FIG. 1.
Figure 4:
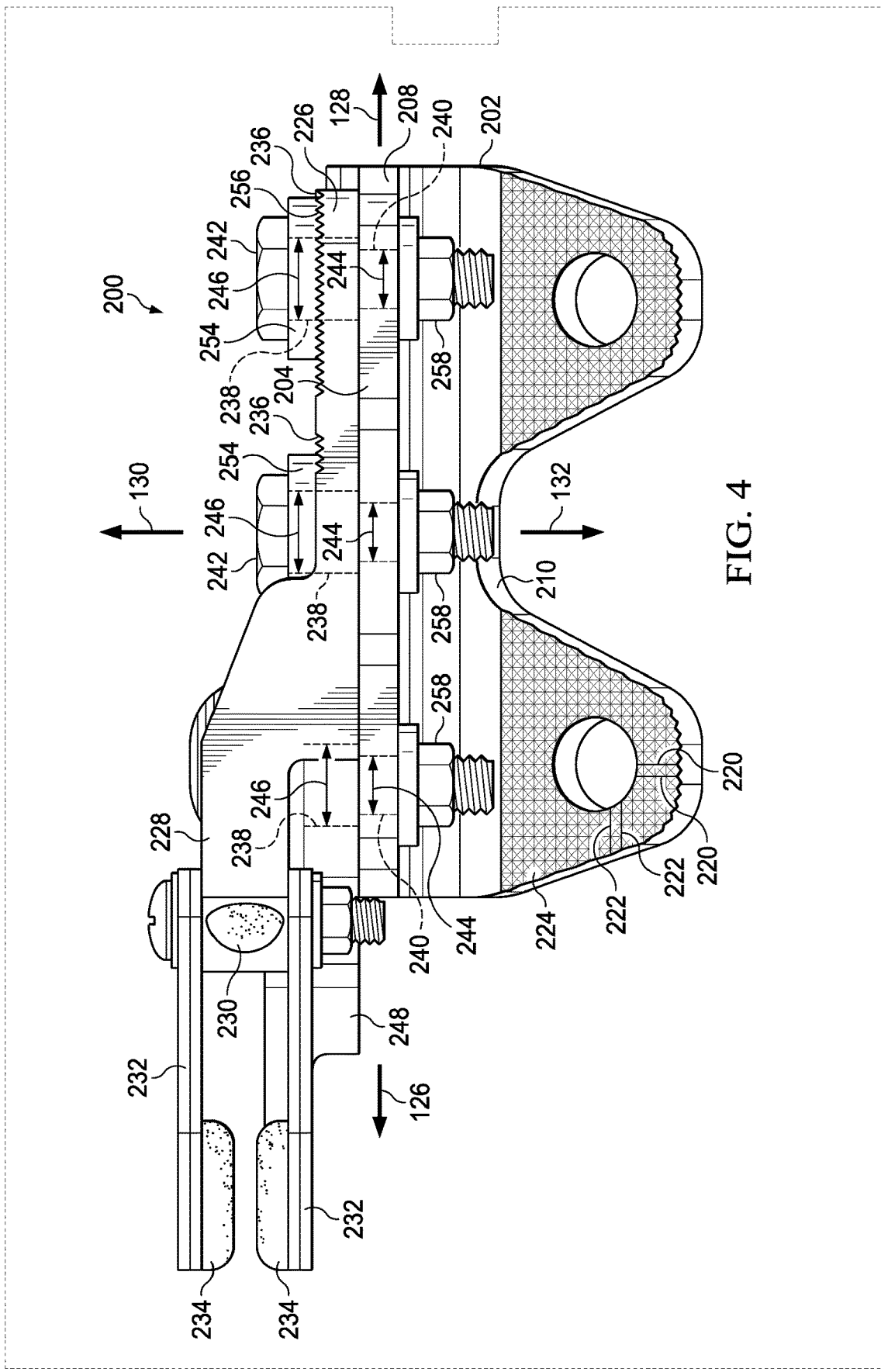
FIG. 4 is an orthogonal side view of the upper hinge of FIG. 2.

Referring now to FIGS. 1 and 2, a helicopter 100 according to the present disclosure is illustrated. Helicopter 100 comprises a fuselage 102, and a main rotor assembly 104, including main rotor blades 106 and a main rotor shaft 108. Helicopter 100 comprises a tail rotor assembly 110 including tail rotor blades 112. Helicopter 100 further comprises a door 114 connected to the fuselage 102. In this embodiment, the door 114 is connected to the fuselage 102 with an upper hinge 200 and a lower hinge 300. In this embodiment, each of the upper hinge 200 and lower hinge 300 are removably attached to the fuselage 102 using a hinge pin 116 that is fixed relative to the fuselage 102. In this embodiment, an upper pin portion 118 of the hinge pin 116 protrudes from an outer skin 120 of the fuselage 102 at upper location and a lower pin portion 122 of the hinge pin 116 protrudes from the outer skin 120 at a lower location. In this embodiment, the hinge pin 116 comprises a fixed hinge axis 124 that extends centrally through and coaxially with the hinge pin 116. In alternative embodiments, the hinge pin 116 can comprise multiple components while still providing portions that similarly extend through the outer skin 120 along the fixed hinge axis 124. In this embodiment, the upper hinge 200 is connected between the door 114 and the fuselage 102 using the upper pin portion 118, and the lower hinge 300 is connected between the door 114 and the fuselage 102 using the lower pin portion 122. Most generally, an installed door 114 can be moved relative to the fuselage 102 by rotating the door 114 and the attached upper hinge 200 and lower hinge 300 about the fixed hinge axis 124. The helicopter 100 generally comprises a fore direction 126 and an opposite aft direction 128, an up direction 130 and an opposite down direction 132, and an inboard direction 134 (toward a centerline of the helicopter 100) (see FIG. 5) and an opposite outboard direction 136 (away from a centerline of the helicopter 100) (see FIG. 5).

Figure 5:
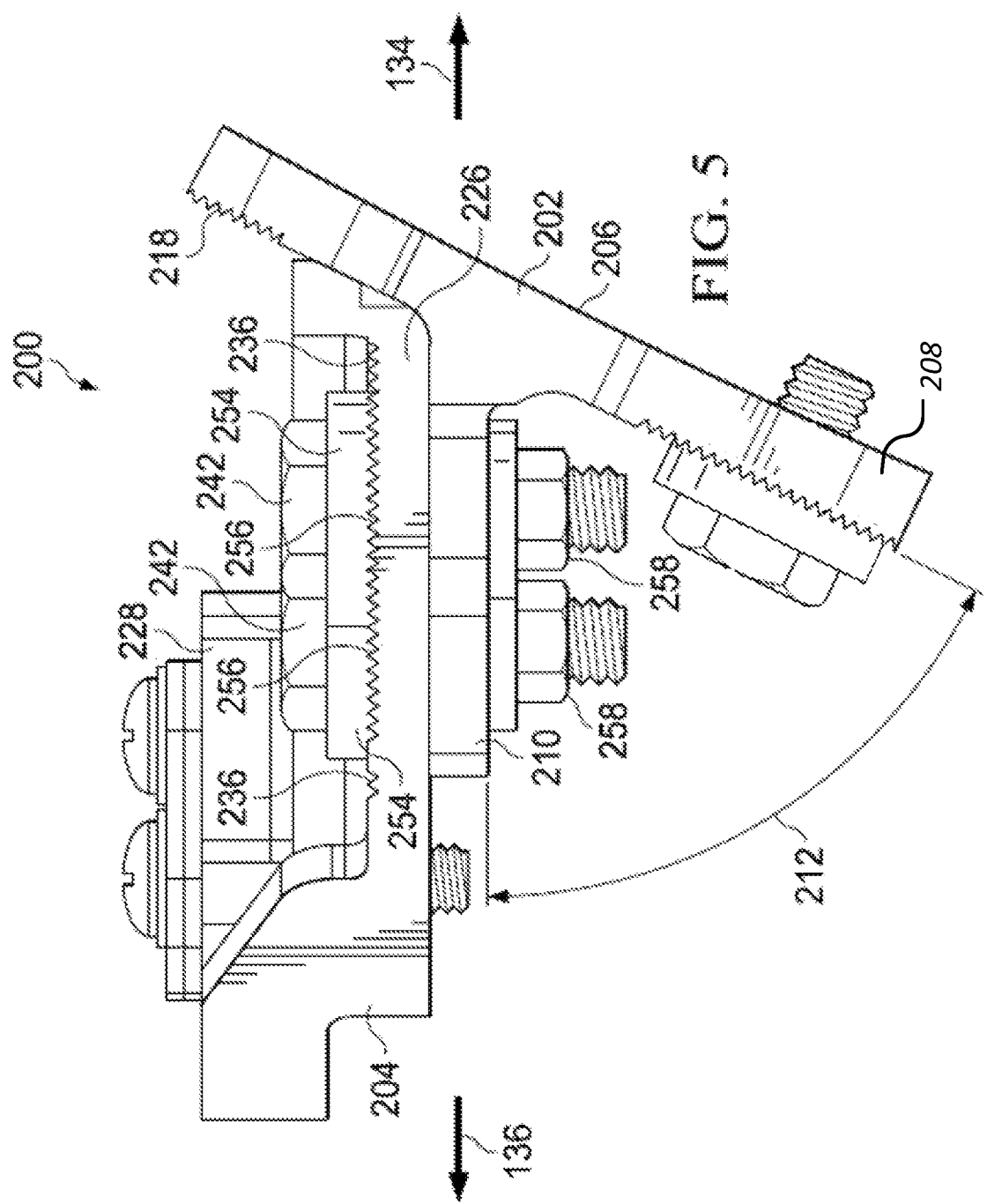
FIG. 5 is an orthogonal rear view of the upper hinge of FIG. 2.
Figure 6:
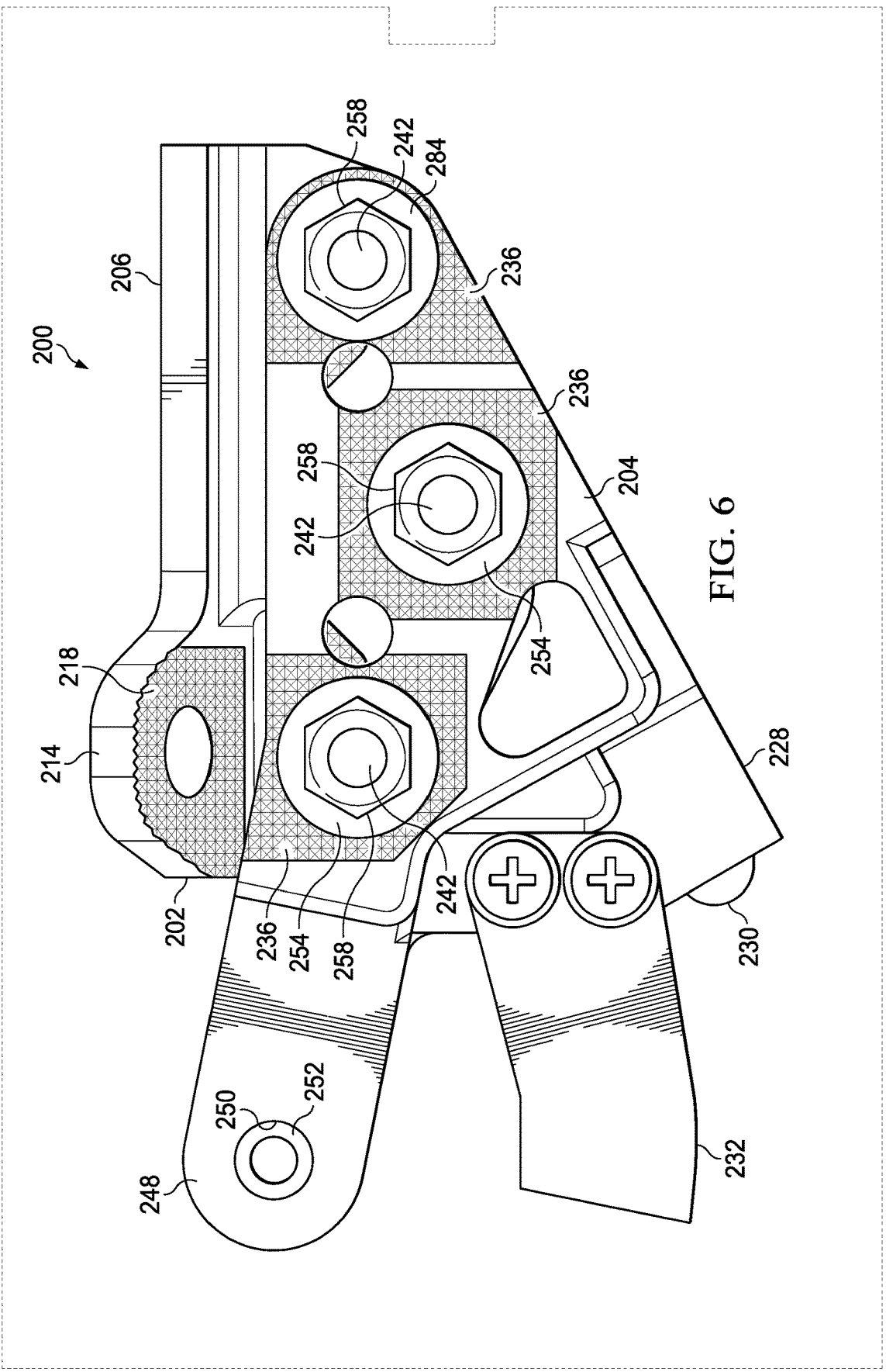
FIG. 6 is an orthogonal top view of the upper hinge of FIG. 2.
Figure 7:
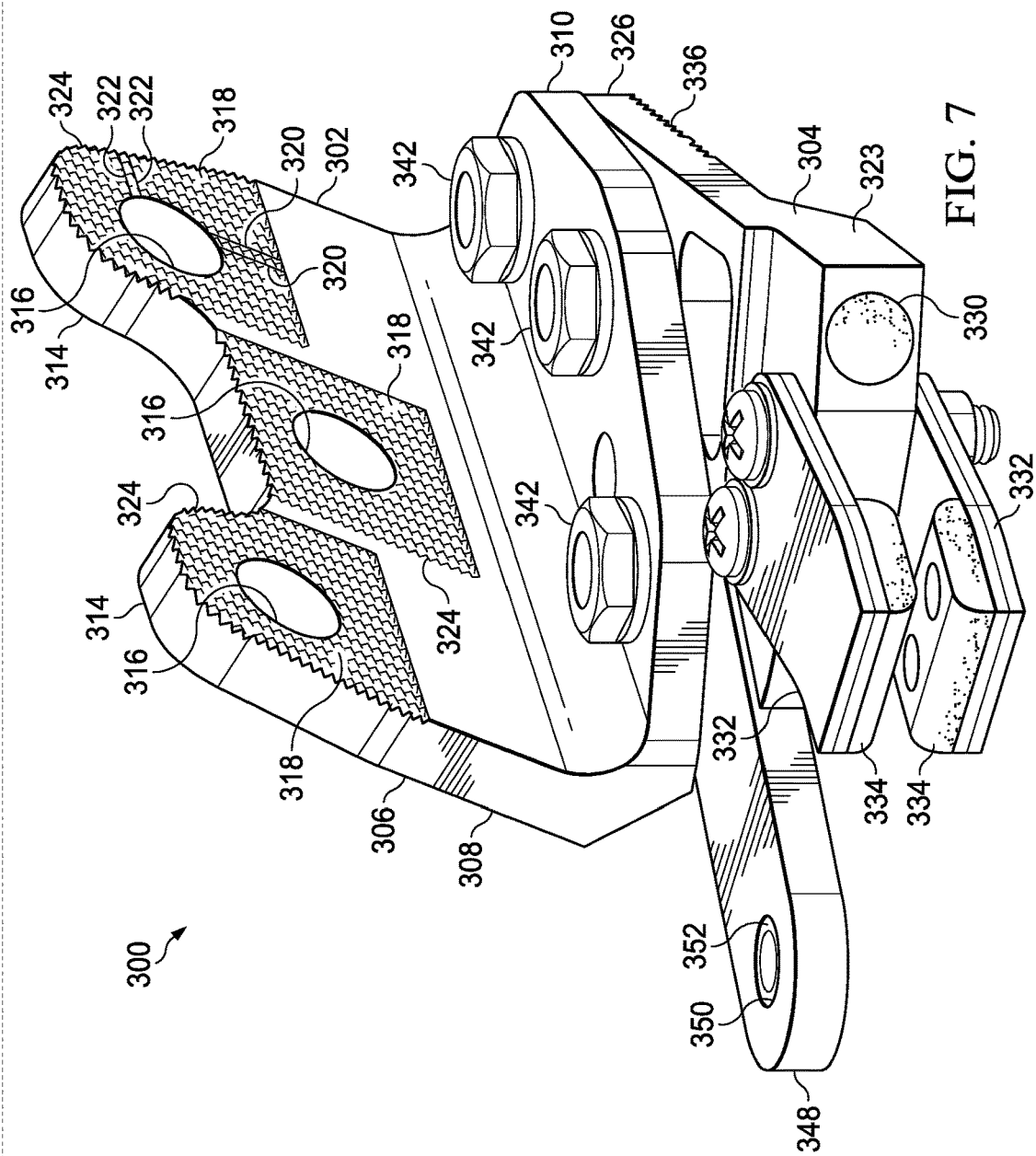
FIG. 7 is an oblique view of a lower hinge of the aircraft of FIG. 1.
Figure 8:
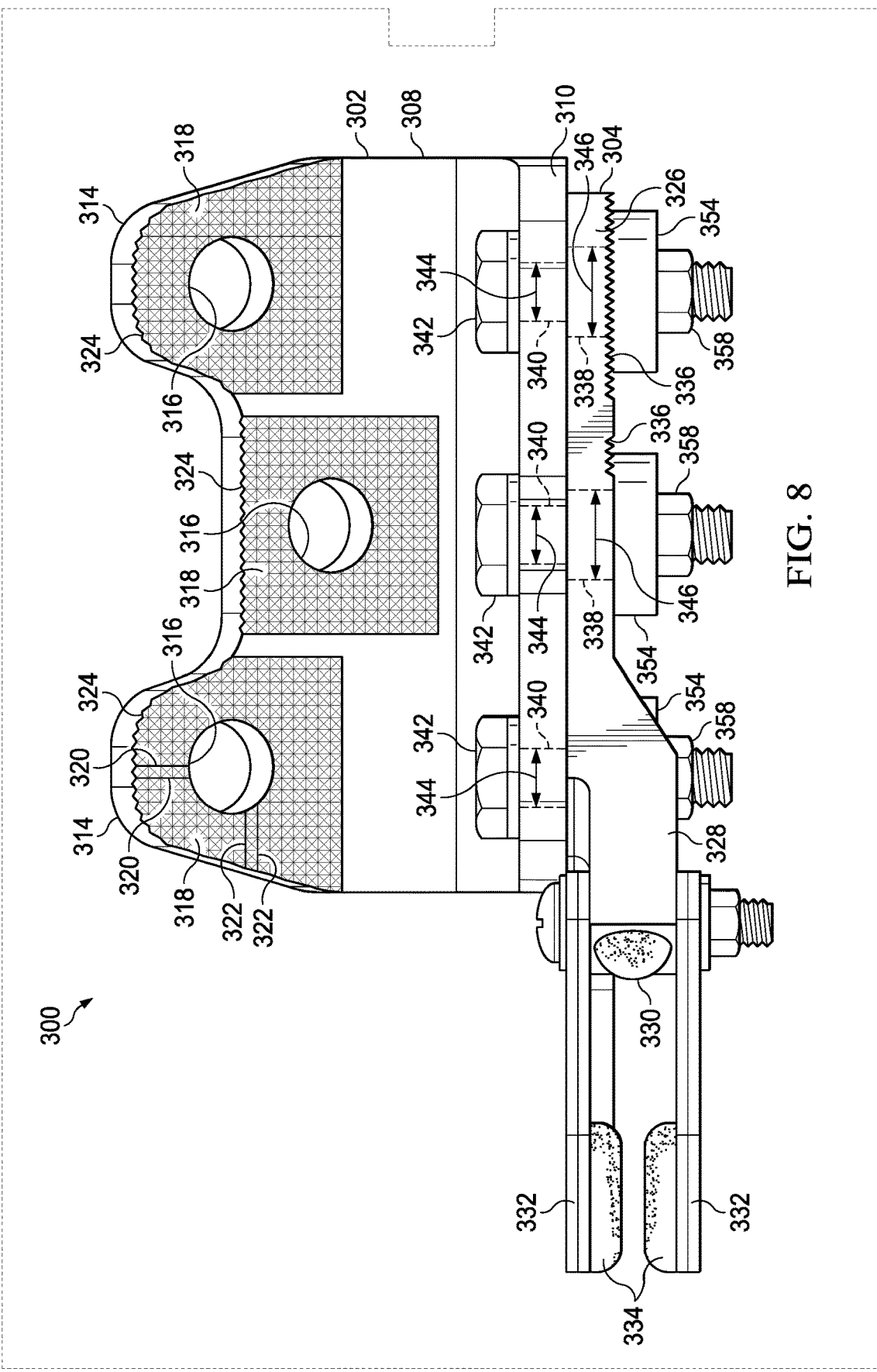
FIG. 8 is an orthogonal side view of the lower hinge of FIG. 7.

Referring now to FIGS. 3-6, the upper hinge 200 is shown. The upper hinge 200 generally comprises a door mount 202 configured for attachment to door 114 and a pin mount 204 configured for attachment to both the upper pin portion 118 and the door mount 202. The door mount 202 comprises a door interface 206 comprising a geometric profile selected to complement a geometric profile of the door 114 so that when the upper hinge 200 is installed, the door mount 202 can lie substantially flush against the door 114. As best seen in FIG. 5, the door interface 206 comprises a curvature selected to match a curvature of the door 114. The door mount 202 generally comprises a fuselage interface plate 208 configured for abutment to the fuselage 102. The door mount 202 further comprises a pin mount interface plate 210 extending in the outboard direction 136 from the fuselage interface plate 208 at a door mount angle 212 (see FIG. 5). The fuselage interface plate 208 comprises fuselage mount tabs 214 that each comprise oversized fuselage mount holes 216. Each of the fuselage mount tabs 214 comprises a patch 218 that generally comprises a series of parallel first grooves 220 extending to the periphery of the patch 218 and a series of parallel second grooves 222 that are substantially orthogonal to the first grooves 220 and which also extend to the periphery of the patch 218 (see FIGS. 3 and 4). The first grooves 220 and second grooves 222 are disposed relative to each other so that multiple protrusions 224 extend away from the fuselage mount tabs 214.

The pin mount 204 comprises a door mount interface plate 226 configured to abut the pin mount interface plate 210. The pin mount 204 further comprises a stabilizer step 228 extending away from the door mount interface plate 226. The stabilizer step 228 further comprises an elastomeric hard stop 230. The stabilizer step 228 is configured to carry two guide bars 232 and each guide bar 232 carries a guide stop 234. The door mount interface plate 226 further comprises patches 236 configured substantially the same as the patches 218 insofar as they comprise first grooves 220 and second grooves 222 that together form protrusions 224. The door mount interface plate 226 further comprises three oversized door mount interface holes 238 that can be substantially coaxially aligned with three close tolerance holes 240 of the pin mount interface plate 210. The close tolerance holes 240 are sized to fit closely with pin mount bolts 242 so that pin mount bolts 242 are not substantially free to move laterally relative to the pin mount interface plate 210 when received through the close tolerance holes 240 (see FIG. 4) because a close tolerance bolt diameter 244 is substantially similarly sized to the diameter of the pin mount bolts 242. The oversized door mount interface holes 238 are sized to have a substantially larger oversized diameter 246 as compared to the diameter of the pin mount bolts 242. The pin mount 204 further comprises a pin step 248 extending laterally from the door mount interface plate 226. The pin step 248 comprises a pin aperture 250 configured to receive a bushing 252 that is configured to receive the hinge pin 116. The upper hinge 200 further comprises serrated washers 254 comprising a patch interface 256 configured to selectively complementarily mate with and/or otherwise abut one or more of the patches 218, 236. The upper hinge 200 further comprises nuts 258 for use with pin mount bolts 242.

Figure 9:
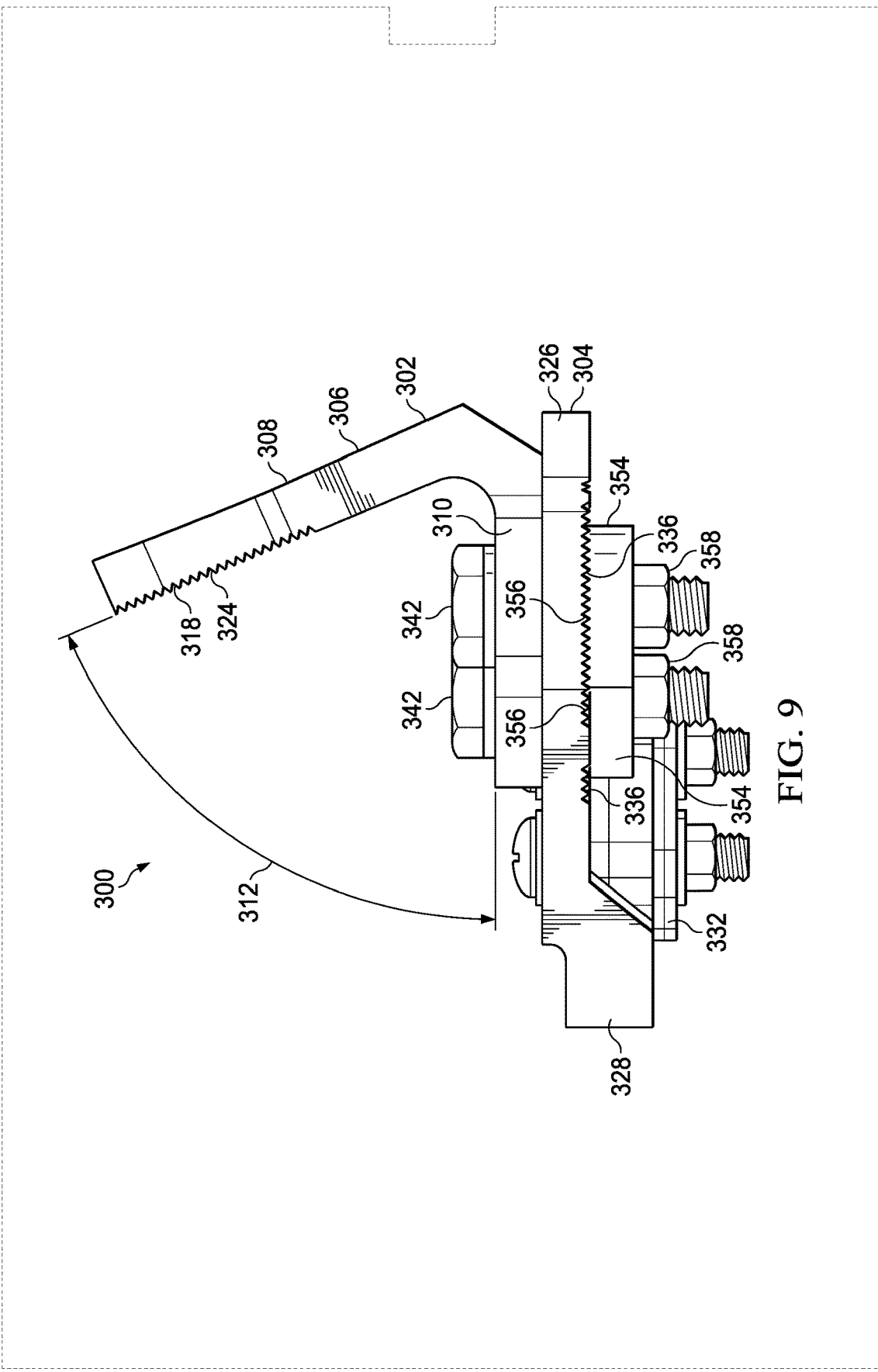
FIG. 9 is an orthogonal rear view of the lower hinge of FIG. 7.
Figure 10:
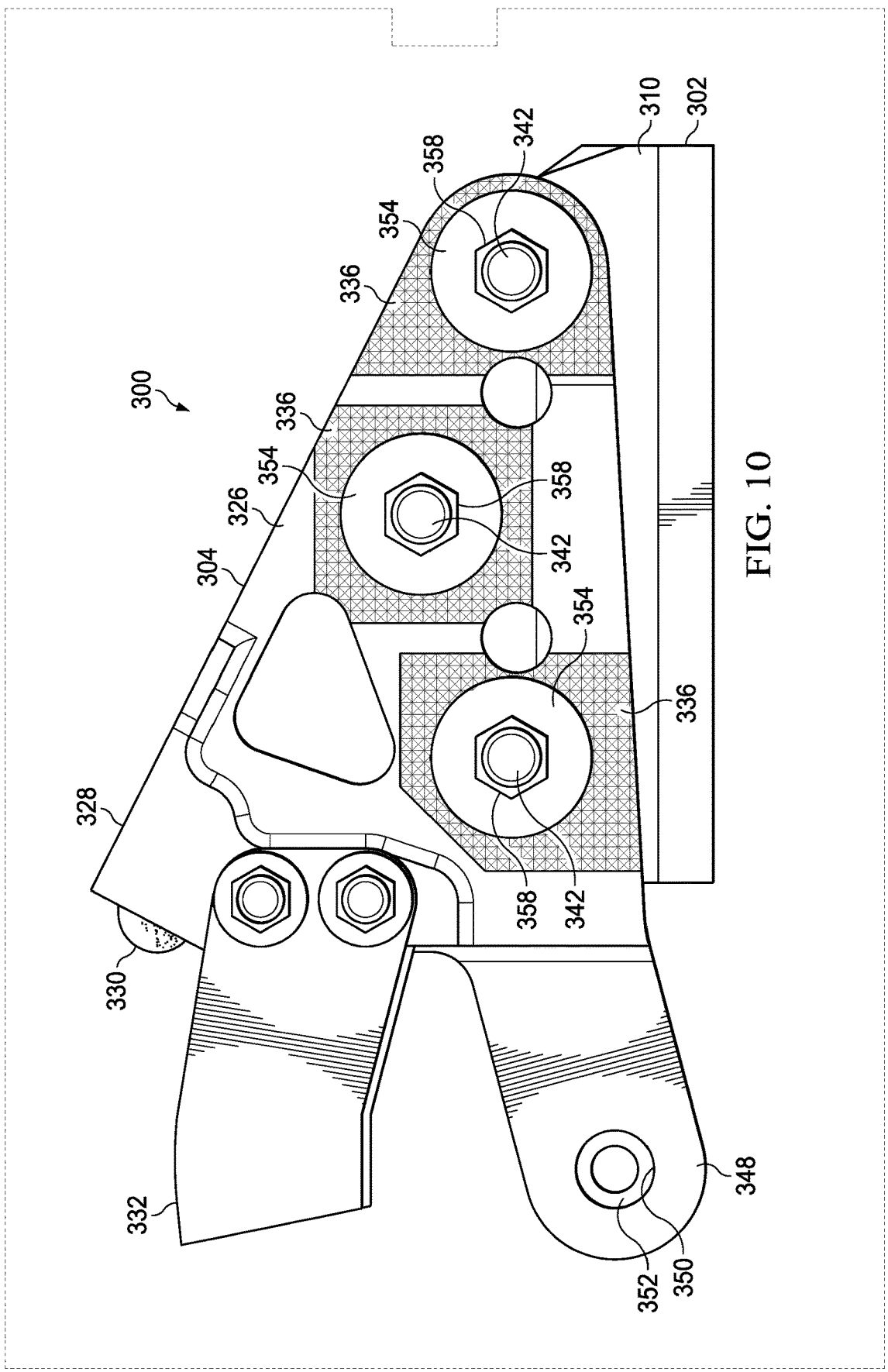
FIG. 10 is an orthogonal top view of the lower hinge of FIG. 7.

Referring now to FIGS. 7-10, the lower hinge 300 is shown. The lower hinge 300 generally comprises a door mount 302 configured for attachment to door 114 and a pin mount 304 configured for attachment to both the lower pin portion 122 and the door mount 302. The door mount 302 comprises a door interface 306 comprising a geometric profile selected to complement a geometric profile of the door 114 so that when the lower hinge 300 is installed, the door mount 302 can lie substantially flush against the door 114. As best seen in FIG. 9, the door interface 306 comprises a curvature selected to match a curvature of the door 114. The door mount 302 generally comprises a fuselage interface plate 308 configured for abutment to the fuselage 102. The door mount 302 further comprises a pin mount interface plate 310 extending in the outboard direction 136 from the fuselage interface plate 308 at a door mount angle 312 (see FIG. 9). The fuselage interface plate 308 comprises fuselage mount tabs 314 that each comprise oversized fuselage mount holes 316. Each of the fuselage mount tabs 314 comprises a patch 318 that generally comprises a series of parallel first grooves 320 extending to the periphery of the patch 318 and a series of parallel second grooves 322 that are substantially orthogonal to the first grooves 320 and which also extend to the periphery of the patch 318 (see FIGS. 3 and 4). The first grooves 320 and second grooves 322 are disposed relative to each other so that multiple protrusions 324 extend away from the fuselage mount tabs 314.

The pin mount 304 comprises a door mount interface plate 326 configured to abut the pin mount interface plate 310. The pin mount 304 further comprises a stabilizer step 328 extending away from the door mount interface plate 326. The stabilizer step 328 further comprises an elastomeric hard stop 330. The stabilizer step 328 is configured to carry two guide bars 332 and each guide bar 332 carries a guide stop 334. The door mount interface plate 326 further comprises patches 336 configured substantially the same as the patches 318 insofar as they comprise first grooves 320 and second grooves 322 that together form protrusions 324. The door mount interface plate 326 further comprises three oversized door mount interface holes 338 that can be substantially coaxially aligned with three close tolerance holes 340 of the pin mount interface plate 310. The close tolerance holes 340 are sized to fit closely with pin mount bolts 342 so that pin mount bolts 342 are not substantially free to move laterally relative to the pin mount interface plate 310 when received through the close tolerance holes 340 (see FIG. 8) because a close tolerance bolt diameter 344 is substantially similarly sized to the diameter of the pin mount bolts 342. The oversized door mount interface holes 338 are sized to have a substantially larger oversized diameter 346 as compared to the diameter of the pin mount bolts 342. The pin mount 304 further comprises a pin arm 348 extending laterally from the door mount interface plate 326. The pin arm 348 comprises a pin aperture 350 configured to receive a bushing 352 that is configured to receive the hinge pin 116. The lower hinge 300 further comprises serrated washers 354 comprising a patch interface 356 configured to selectively complementarily mate with and/or otherwise abut one or more of the patches 318, 336. The lower hinge 300 further comprises nuts 358 for use with pin mount bolts 342.

In some cases, a door 114 can be connected to a fuselage 102 using a hinge pin 116 by first independently supporting the door 114 relative to the fuselage 102 in a desired closed position. Next, the upper hinge 200 can be assembled by first connecting the door mount 202 to the door 114 using and receiving holes of the door 114 (not shown) and using bolts substantially similar to pin mount bolts 242 which have a diameter substantially smaller than the oversized fuselage mount holes 216. Before inserting the bolts through the oversized fuselage mount holes 216, serrated washers 254 are located on the bolts so that the serrated washers 254 are disposed between the heads of the bolts and the door mount 202. In this embodiment, the patch interface 256 of the serrated washers 254 can selectively be engaged with the patches 218 so that a location of the door mount 202 can be selectively moved in the fore direction 126, aft direction 128, up direction 130, and down direction 132. An initial connection of the door mount 202 can be made and subsequently adjusted by loosening the bolts and moving the bolts within the oversized fuselage mount holes 216. Regardless of where the bolts are located (however off-center and in whatever direction) relative to the oversized fuselage mount holes 216, the selective gripping between the serrated washers 254 and the door mount 202 nonetheless provides for a secure connection.

Next, with the door mount 202 connected to the door 114, the pin mount 204 can be mounted to the upper pin portion 118 of the hinge pin 116 by inserting the hinge pin 116 through the pin aperture 250. Next, the pin mount 204 can be rotated into a position that overlaps the door mount 202. Next, the oversized door mount interface holes 238 and the close tolerance holes 240 can be aligned sufficiently to allow passage of pin mount bolts 242. Before inserting the pin mount bolts 242, serrated washers 254 are placed on the pin mount bolts 242 so that the patch interfaces 256 face the patches 236. With serrated washers 254 on the pin mount bolts 242, the pin mount bolts 242 are threaded through both the oversized door mount interface holes 238 and the close tolerance holes 240. Next, nuts 258 can be used to secure the door mount 202 relative to the pin mount 204. In this embodiment, the connection between the door mount 202 and the pin mount 204 can be adjusted in an inboard direction (generally inward toward a centerline of the helicopter 100), an outboard direction (generally outward away from a centerline of the helicopter 100), a fore direction 126, and an aft direction 128.

Next, the door mount 302 can be connected to the door 114 in a manner substantially similar to the method described above with regard to connecting the door mount 202 to the door 114. Once the door mount 302 is connected to the door 114, the pin mount 304 can be mounted to the lower pin portion 122 of the hinge pin 116 by inserting the hinge pin 116 into the pin aperture 350. Next, the pin mount 304 can be connected to the door mount 302 in a manner substantially similar to the method described above with regard to connecting the pin mount 204 to the door mount 202. Taken as a whole, each of the upper hinge 200 and the lower hinge 300 allow for adjustment of the door 114 relative to the static location of the fixed hinge axis 124. Most generally, the systems and methods disclosed allow for easy initial connection of the door 114 relative to the hinge pin 116 while allowing for easy fine adjustment in a variety of directions to accomplish a desired close fit between the door 114 and the fuselage 102.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A hinge, comprising:
    a fuselage interface plate comprising a door interface comprising a serrated surface and an oversized hole;
    a pin mount interface plate extending away from the fuselage interface plate, the pin mount interface plate being fixed relative to the fuselage interface plate;
    a bolt at least partially extending into the oversized hole; and
    a washer disposed on the bolt and captured between the door interface and a head of the bolt, the washer comprising a serrated surface facing toward the serrated surface of the door interface;
    wherein the oversized hole comprises a diameter selected to allow radial movement of the bolt within the oversized hole.

2. The hinge of claim 1, wherein the pin mount interface plate is connected to the door interface at an acute angle.

3. The hinge of claim 1, wherein the pin mount interface plate comprises a close tolerance hole.

4. The hinge of claim 3, further comprising:
    a pin mount comprising an oversized door mount interface hole and a serrated surface facing away from the pin mount interface plate; and
    a pin mount bolt extending through both the close tolerance hole and the oversized door mount interface hole, wherein the close tolerance hole comprises a diameter selected to allow very little radial movement of the pin mount bolt within the close tolerance hole, and wherein the oversized door mount interface hole comprises a diameter selected to allow relatively more radial movement of the pin mount bolt within the oversized door mount interface hole as compared to the allowed radial movement of the pin mount bolt within the close tolerance hole.

5. The hinge of claim 4, further comprising:
    a serrated washer disposed on the pin mount bolt and captured between a nut and the serrated surface of the pin mount.

6. The hinge of claim 5, wherein the serrated surface of the pin mount is complementary to the serrated surface of the serrated washer that is captured between the nut and the serrated surface of the pin mount.

7. The hinge of claim 6, wherein the serrated surface of the pin mount comprises a plurality of parallel first grooves and a plurality of parallel second grooves, the first grooves being substantially orthogonal to the second grooves.

8. The hinge of claim 7, wherein the pin mount comprises a pin aperture configured to receive a hinge pin.

9. The hinge of claim 8, wherein the hinge pin is disposed along a static fixed hinge axis.

10. The hinge of claim 9, wherein the door interface can be moved in three dimensions relative to the fixed hinge axis at least by a combination of (1) changing a location of the washer associated with the door interface relative to the serrated surface of the door interface and (2) changing a location of the serrated washer associated with the pin mount relative to the serrated surface of the pin mount.

11. A helicopter, comprising:
    a fuselage;
    a hinge pin carried by the fuselage and disposed along a fixed hinge axis;
    a door; and
    a hinge, comprising:
        a fuselage interface plate comprising a door interface connected to the door, the door interface comprising a serrated surface and an oversized hole;
        a pin mount interface plate extending away from the fuselage interface plate, the pin mount interface plate being fixed relative to the fuselage interface plate;
        a bolt at least partially extending into the oversized hole; and
        a washer disposed on the bolt and captured between the door interface and a head of the bolt, the washer comprising a serrated surface facing toward the serrated surface of the door interface;
        wherein the oversized hole comprises a diameter selected to allow radial movement of the bolt within the oversized hole.

12. The helicopter of claim 11, wherein the door can be moved in two dimensions relative to the fixed hinge axis at least by changing a location of the washer associated with the door interface relative to the serrated surface of the door interface.

13. The helicopter of claim 12, wherein movement in the two dimensions comprises movement in an up direction, movement in a down direction, movement in a fore direction, and movement in an aft direction.

14. The helicopter of claim 13, wherein the hinge further comprises:
    wherein the pin mount interface plate is connected to the door interface at an acute angle and the pin mount interface plate comprises a close tolerance hole;

a pin mount comprising an oversized door mount interface hole and a serrated surface facing away from the pin mount interface; and
a pin mount bolt extending through both the close tolerance hole and the oversized door mount interface hole, wherein the close tolerance hole comprises a diameter selected to allow very little radial movement of the pin mount bolt within the close tolerance hole, and wherein the oversized door mount interface hole comprises a diameter selected to allow relatively more radial movement of the pin mount bolt within the oversized door mount interface hole as compared to the allowed radial movement of the pin mount bolt within the close tolerance hole.

15. The helicopter of claim 14, further comprising:
a serrated washer disposed on the pin mount bolt and captured between a nut and the serrated surface of the pin mount.

16. The helicopter of claim 15, wherein the serrated surface of the pin mount is complementary to the serrated surface of the serrated washer that is captured between the nut and the serrated surface of the pin mount.

17. The helicopter of claim 16, wherein the serrated surface of the pin mount comprises a plurality of parallel first grooves and a plurality of parallel second grooves, the first grooves being substantially orthogonal to the second grooves.

18. The helicopter of claim 17, wherein the pin mount comprises a pin aperture configured to receive the hinge pin.

19. A hinge, comprising:
a door mount, comprising:
a fuselage interface plate comprising a side having a serrated surface and an oversized hole; and
a pin mount interface plate extending away from the fuselage interface plate from the side having the serrated surface, the pin mount interface plate being fixed relative to the fuselage interface plate.

20. The hinge of claim 19, further comprising:
a pin mount comprising a door mount interface plate connected to the pin mount interface plate, the door mount interface plate comprising a serrated surface facing away from the pin mount interface plate.

* * * * *